US 11,460,213 B2

(12) United States Patent
Lopez

(10) Patent No.: US 11,460,213 B2
(45) Date of Patent: Oct. 4, 2022

(54) DEVICE FOR SECURING AT LEAST ONE INSULATION ON A DUCT, DUCT EQUIPPED WITH SAID SECURING DEVICE

(71) Applicant: Airbus Operations S.A.S., Toulouse (FR)

(72) Inventor: José Lopez, Bellesserre (FR)

(73) Assignee: Airbus Operations S.A.S.

( * ) Notice: Subject to any disclaimer, the term of this patent is extended or adjusted under 35 U.S.C. 154(b) by 710 days.

(21) Appl. No.: 16/199,633

(22) Filed: Nov. 26, 2018

(65) Prior Publication Data

US 2019/0170387 A1 Jun. 6, 2019

(30) Foreign Application Priority Data

Dec. 1, 2017 (FR) ..................... 17 61556

(51) Int. Cl.
| | |
|---|---|
| *F16L 3/20* | (2006.01) |
| *F16L 3/237* | (2006.01) |
| *F16L 3/26* | (2006.01) |
| *F16L 3/10* | (2006.01) |
| *F16L 59/12* | (2006.01) |
| *F16L 59/135* | (2006.01) |
| *F16L 59/14* | (2006.01) |
| *F16L 59/20* | (2006.01) |
| *F24F 13/02* | (2006.01) |

(52) U.S. Cl.
CPC ........ *F24F 13/0209* (2013.01); *F16L 3/1025* (2013.01); *F16L 3/20* (2013.01); *F16L 3/237* (2013.01); *F16L 59/12* (2013.01); *F16L 59/135* (2013.01); *F16L 59/14* (2013.01); *F16L 59/20* (2013.01); *F24F 13/0263* (2013.01); *F16L 3/26* (2013.01)

(58) Field of Classification Search
CPC . F16L 3/1025; F16L 3/20; F16L 3/237; F16L 59/12; F16L 59/135; F16L 59/14; F16L 59/20; F16L 3/26; F16L 3/08; F16L 3/04; F16L 21/06; F16L 3/10; F16L 3/243; F16L 59/023; F24F 13/0209; F24F 13/0263
USPC .................................. 285/47, 54, 373, 419
See application file for complete search history.

(56) References Cited

U.S. PATENT DOCUMENTS

| | | | |
|---|---|---|---|
| 4,465,252 A | | 8/1984 | Donovan, Jr. et al. |
| 4,560,188 A | | 12/1985 | Berti et al. |
| 5,261,633 A | | 11/1993 | Mastro |
| 5,620,210 A | * | 4/1997 | Eyster .................... F16L 21/06 |
| 6,315,006 B1 | | 11/2001 | Opperthauser |
| 7,350,834 B2 | * | 4/2008 | Ryhman |

(Continued)

FOREIGN PATENT DOCUMENTS

| | | | |
|---|---|---|---|
| EP | 2 476 942 A1 | 7/2012 | |
| EP | 2881644 A1 * | 6/2015 | ............ F16L 59/023 |
| WO | 2012/092650 A1 | 7/2012 | |

*Primary Examiner* — Zachary T Dragicevich
*Assistant Examiner* — William S. Choi
(74) *Attorney, Agent, or Firm* — Lerner, David, Littenberg, Krumholz & Mentlik, LLP

(57) ABSTRACT

A device for securing at least one insulating tube on a duct, includes an inner ring configured to be mounted on the duct, an outer ring coaxial to the inner ring, and a transverse web linking the inner and outer rings, the inner and outer rings and the transverse web forming two recesses, arranged on either side of the transverse web, each configured to receive an end of an insulating tube.

13 Claims, 3 Drawing Sheets

(56) References Cited

U.S. PATENT DOCUMENTS

| | | |
|---|---|---|
| 9,534,706 B2 | 1/2017 | Larsson |
| 2002/0033604 A1* | 3/2002 | Minemyer .................... 285/373 |
| 2006/0255592 A1* | 11/2006 | Minemyer .................... 285/373 |
| 2015/0316178 A1* | 11/2015 | Patil ......................... F16L 3/10 |

* cited by examiner

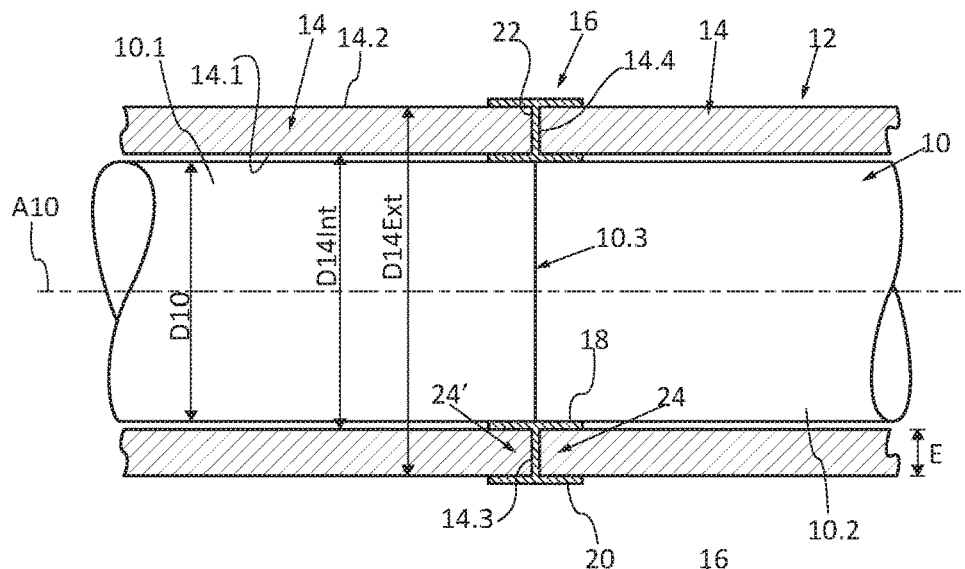
Fig. 1
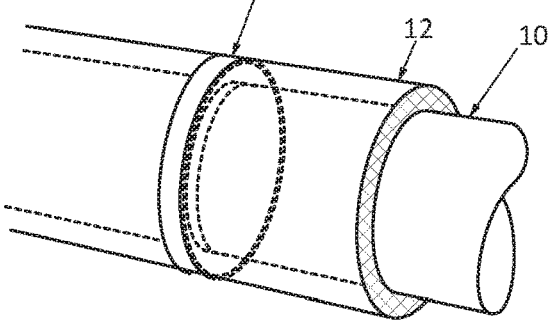
Fig. 2
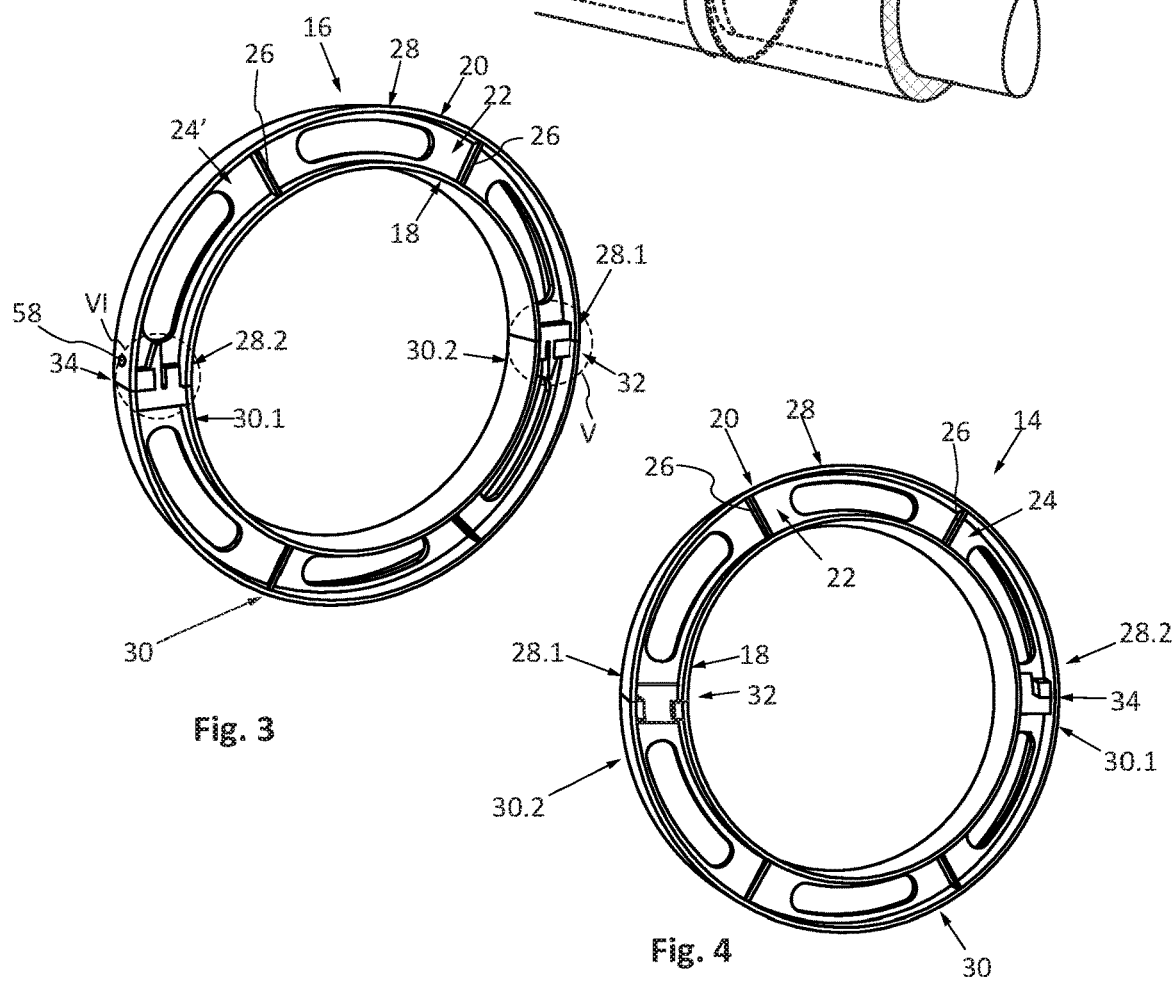
Fig. 3
Fig. 4

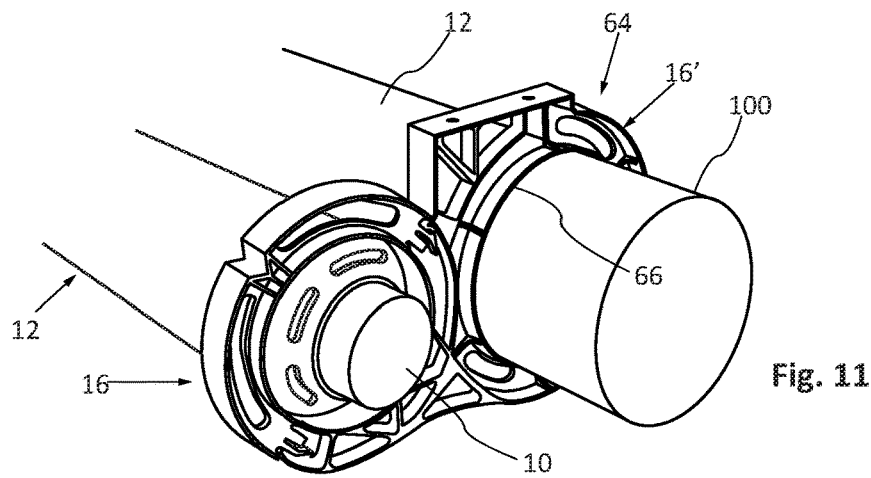
Fig. 11
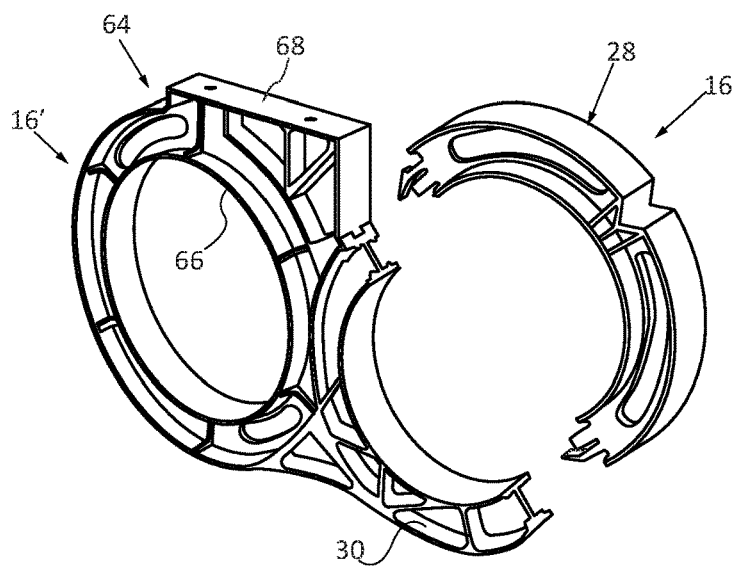
Fig. 12
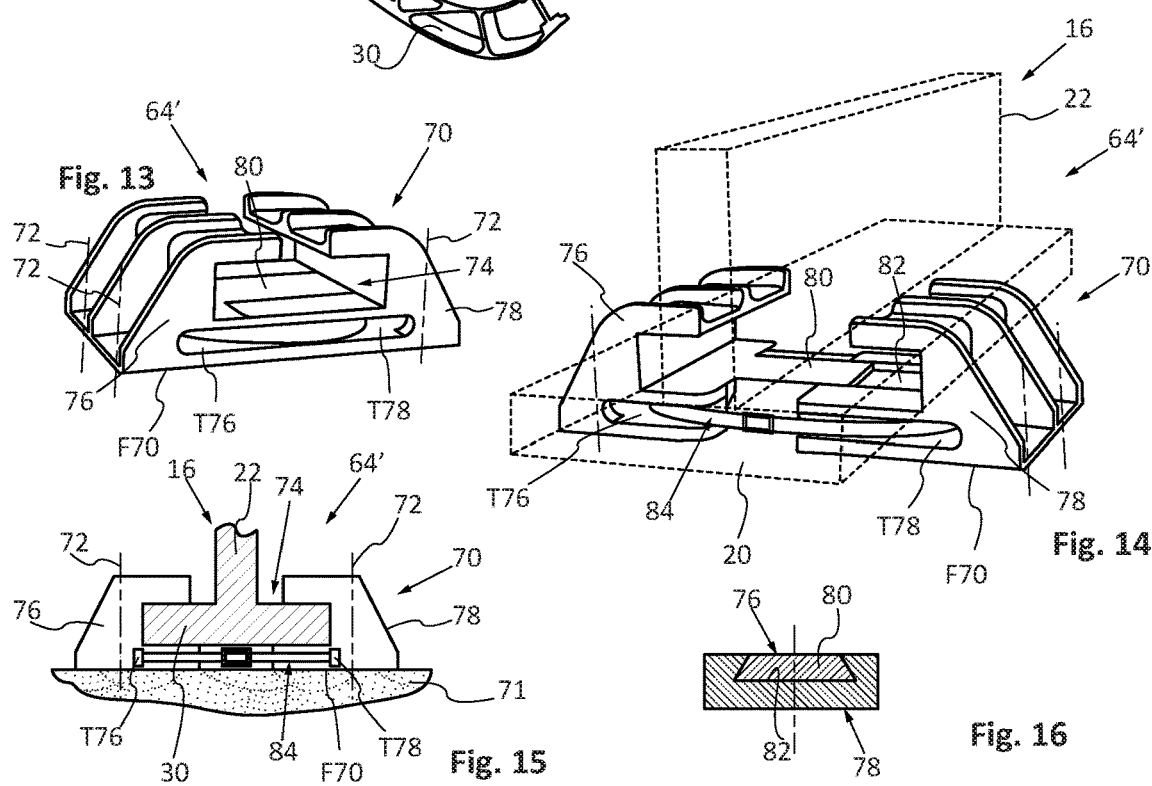
Fig. 13
Fig. 14
Fig. 15
Fig. 16

DEVICE FOR SECURING AT LEAST ONE INSULATION ON A DUCT, DUCT EQUIPPED WITH SAID SECURING DEVICE

FIELD OF THE INVENTION

The present application relates to a device for securing at least one insulator on a duct and a duct equipped with said securing device.

BACKGROUND OF THE INVENTION

In an aircraft, some ducts, used for example to convey hot air, have to be insulated.

To this end, a tubular insulation is positioned around the duct. To secure it in place, the inner face of the tubular insulation is glued onto the duct and an adhesive tape is wound around the tubular insulation.

This embodiment is not fully satisfactory because it is difficult to change the insulation without having to change the duct to which it is glued.

BRIEF SUMMARY OF THE INVENTION

Aspects of the present invention may remedy the drawbacks of the prior art.

An embodiment of the invention is a device for securing at least one insulating tube on a duct, characterised in that the securing device comprises an inner ring configured to be mounted on the duct, an outer ring coaxial to the inner ring, and a transverse web linking the inner and outer rings, each inner or outer ring extending on either side of the transverse web such that the securing device has an I-shaped section in a longitudinal plane and that the inner and outer rings and the transverse web form two recesses, arranged on either side of the transverse web, each configured to receive an end of an insulating tube.

This securing device makes it possible to secure the insulating tube or tubes on the duct to be insulated without needing to glue them which makes it possible to change the insulating tubes without having to change the duct.

According to another feature, the securing device comprises first and second parts which each extend over a half-circumference of the duct, each of the first and second parts respectively comprising first and second ends, the first end of the first part being linked to the second end of the second part by a first link, the second end of the first part being linked to the first end of the second part by a second link.

According to a variant, the first and second parts of the securing device are identical for each first or second part, the first end being different from the second end and complementary thereto.

According to another feature, at least one of the first and second links comprises at least one guiding system, making it possible to guide the first and second ends relative to one another in a direction of introduction, and at least one locking system making it possible to immobilize the first and second ends in the direction of introduction.

According to one embodiment, the guiding system comprises at least one tenon integral to the first end, protruding from a first end face of the first end and configured to be housed in at least one recess formed in the second end and hollowed out relative to the second end face of the second end, the tenon and the recess having complementary forms so that the tenon slides into the recess in the direction of introduction, the first and second end faces being pressed against one another when the first and second parts are assembled.

According to one embodiment, the recess is delimited by the transverse web and two rails, parallel to the transverse web, linked respectively to the inner ring and to the outer ring.

According to one configuration, the guiding system comprises two tenons, integral to the first end, configured to be housed in two recesses, formed in the second end, that are symmetrical relative to the transverse web.

According to another feature, the locking system comprises a tongue, linked to one of the first or second ends, which has a hook form configured to cooperate with a notch integral to the other of the first or second ends, the tongue being elastically deformable between a state of rest in which the hook form is in contact with the notch and an elastically deformed state in which the hook form is moved away from the notch.

According to one embodiment, the tongue has an inclined flat making it possible to deform the tongue to the deformed state when mounting the two parts of the securing device.

According to one configuration, at least one of the tenons comprises a slit which makes it possible to separate the tongue from the rest of the tenon in order for it to be able to be deformed between the rest and deformed states.

According to another feature, the securing device comprises a fixing system.

According to a first variant, the fixing system comprises a ring linked to one of the parts of the fixing device and configured to be mounted on a main duct.

According to one embodiment, the ring configured to be fitted on a main duct is an inner ring of a second fixing device.

According to a second variant, the fixing system comprises a body which has a first contact surface, configured to be pressed and fixed by link elements onto a support or a structure, and a T-shaped groove configured to receive the outer ring of the securing device and a part of its transverse web.

According to one embodiment, the body comprises a first jaw and a second jaw which delimit the T-shaped groove and which are configured to slide relative to one another in order to adjust the dimension of the T-shaped groove, the fixing system comprising a link for linking the first and second jaws.

A duct equipped with at least one securing device is also a subject of the invention.

BRIEF DESCRIPTION OF THE DRAWINGS

Other features and advantages will emerge from the following description of the invention, a description given by way of example only, in light of the attached drawings in which:

FIG. 1 is a longitudinal cross section of a duct equipped with a device for securing at least one insulation which illustrates an embodiment of the invention, FIG. 2 is a perspective view of a duct equipped with devices for securing insulations which illustrates an embodiment of the invention, FIG. 3 is a view of a first face of a securing device which illustrates a first embodiment of the invention, FIG. 4 is a view of a second face of the securing device visible in FIG. 3, FIG. 11 is a perspective view of a first securing device mounted on a duct and linked to a second duct by a link system which illustrates a first embodiment of the invention, FIG. 12 is a perspective view of the first securing device visible in FIG. 11, in the dismantled state, FIG. 13 is a perspective view of a fixing system which illustrates a second embodiment of the invention, FIG. 14 is a perspective view of the fixing system visible in FIG. 13, mounted on a securing device represented by dotted lines, FIG. 15 is a side view of the fixing system visible in FIG. 14, and FIG. 16 is a cross section of the fixing system visible in FIG. 14.

DETAILED DESCRIPTION

Figure 5:
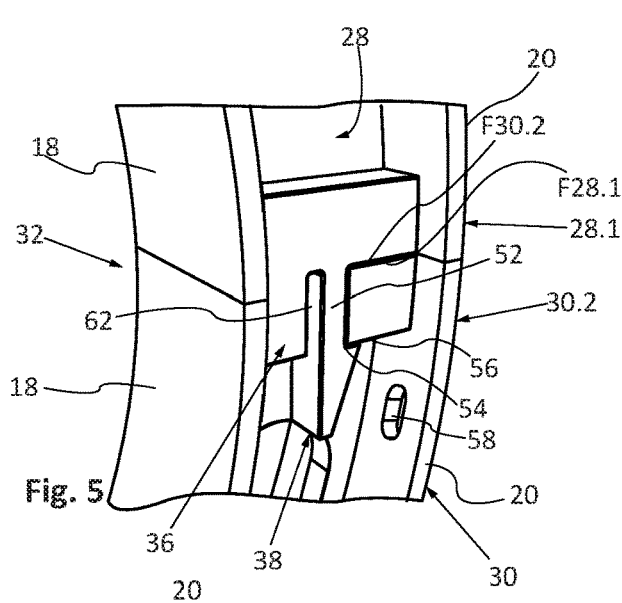
FIG. 5 is a detail view of a zone V of FIG. 3 which illustrates a link between two parts of the securing device visible in FIG. 3.
Figure 6:
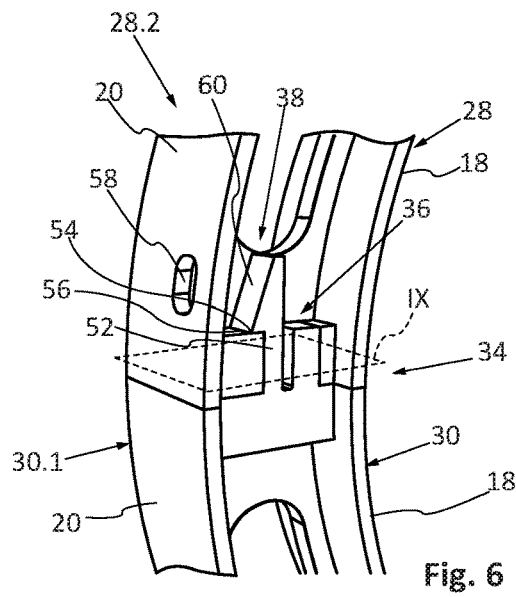
FIG. 6 is a detail view which illustrates a link between two parts of the securing device visible in FIG. 3.
Figure 7:
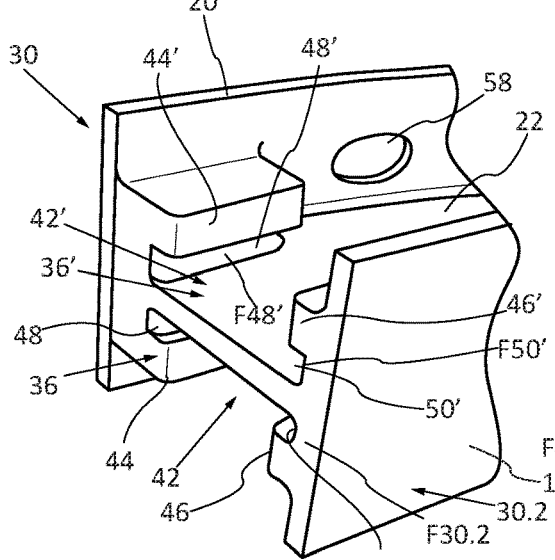
FIG. 7 is a perspective view of a first end of a first part of the securing device visible in FIG. 3, in the dismantled state.
Figure 8:
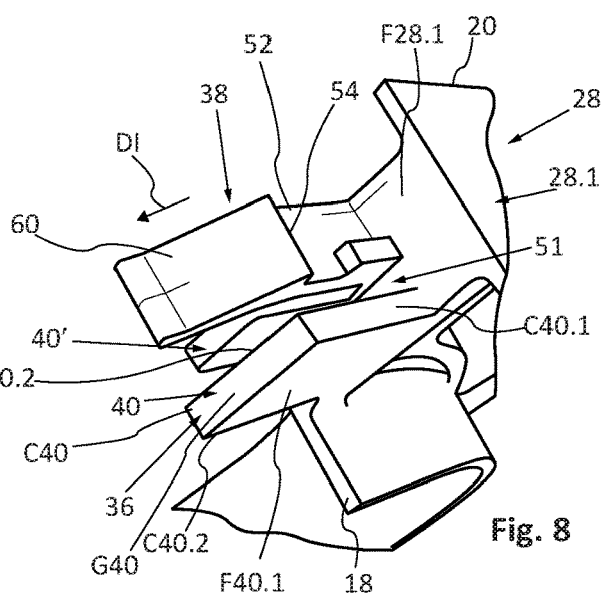
FIG. 8 is a perspective view of a second end of the first part of the securing device visible in FIG. 3, in the dismantled state.
Figure 9:
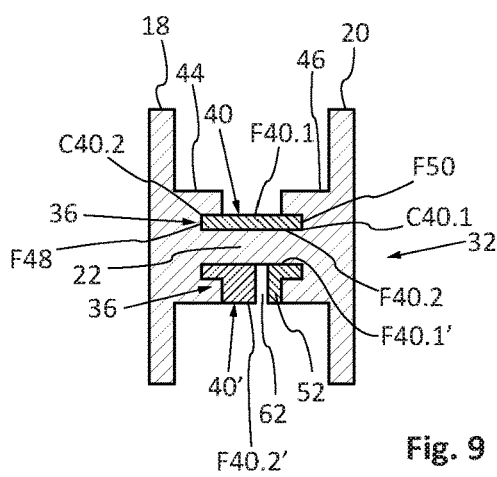
FIG. 9 is a cross section along the plane IX of FIG. 6.

FIGS. 1 and 2 show a duct 10 composed, by way of example, of several sections 10.1 and 10.2 arranged end-to-end in a junction zone 10.3 and at least one insulation 12 surrounding the duct 10. The duct 10 has an outer diameter D10.

The duct 10 has an axis A10. Hereinafter in the description, a longitudinal direction is parallel to the axis A10 of the duct 10. A transverse plane is at right angles to the axis A10. A longitudinal plane contains the axis A10 of the duct 10.

According to one embodiment, the insulation 12 is tubular and comprises several tubes 14 placed end-to-end which each comprise an inner face 14.1 with an inner diameter D14int greater than or equal to the outer diameter D10 of the duct 10, an outer face 14.2 with an outer diameter D14ext, a first end rim 14.3 and a second end rim 14.4. According to a first embodiment, each tube 14 is slit to be placed around the duct 10. According to a second embodiment, each tube 14 comprises two half-tubes.

When the insulation 12 is mounted around the duct 10, the inner and outer faces 14.1, 14.2 are approximately coaxial to the axis A10 of the duct 10 and the first and second end rims 14.3, 14.4 are positioned in transverse planes. Each end rim 14.3, 14.4 has a thickness E which corresponds to the distance separating the inner and outer faces 14.1, 14.2 in a direction at right angles to the axis A10 of the duct 10.

The duct 10 is equipped with at least one securing device 16.

According to one configuration, the duct 10 comprises several securing devices 16 inserted between the tubes 14.

As illustrated in FIGS. 1, 3 and 4, each securing device 16 comprises an inner ring 18, configured to be fitted over the duct 10, which has an inner diameter substantially equal to the outer diameter D10 of the duct, an outer ring 20, coaxial to the inner ring 18, and a transverse web 22 linking the inner and outer rings 18, 20, approximately at right angles to the axes of the inner and outer rings 18, 20. Each inner or outer ring 18, 20 is tubular. When the securing device 16 is mounted on the duct 10, the inner and outer rings 18, 20 are coaxial to the axis A10 of the duct 10 and the transverse web 22 is positioned in a transverse plane.

According to one configuration, each inner or outer ring 18, 20 extends on either side of the transverse web 22 such that the securing device 16 has an I-shaped section in a longitudinal plane.

The inner and outer rings 18, 20 are spaced apart by a distance equal to the thickness E of the tube 14.

The inner and outer rings 18, 20 and the transverse web 22 form two recesses 24, 24', arranged on either side of the transverse web 22, each configured to receive an end of a tube 14, the first or second end rim 14.3 or 14.4 of the tube 14 being pressed against, or close to, the transverse web 22, the inner face 14.1 and the outer face 14.2 of the tube 14 being in contact respectively with the inner ring 18 and the outer ring 20.

The transverse web 22 can be holed to reduce the weight of the securing device 16.

The inner and outer rings 18, 20 and the transverse web 22 can be linked by ribs 26 to reinforce the mechanical strength of the securing device 16.

According to a feature of the invention, the securing device 16 is produced in two parts and comprises first and second parts 28, 30 which each extend over a half-circumference of the duct 10. This configuration makes it possible to be able to mount the securing device 16 on the duct 10.

Each of the first and second parts 28, 30 respectively comprises first and second ends 28.1, 28.2, 30.1, 30.2, the first end 28.1 of the first part 28 being linked to the second end 30.2 of the second part 30 by a first link 32, the second end 28.2 of the first part 28 being linked to the first end 30.1 of the second part 30 by a second link 34.

According to a first variant illustrated by FIGS. 3 and 4, the first and second parts 28, 30 are identical. For each first or second part 28, 30, the first end 28.1, 30.1 is different from the second end 28.2, 30.2 and complementary thereto.

According to a second variant illustrated by FIGS. 11 and 12, the first and second parts 28, 30 are different. For each first or second part 28, 30, the first end 28.1, 30.1 is identical to the second end 28.2, 30.2.

For both variants, the first and second links 32 and 34 are identical, can be assembled without tools and are represented in detail in FIGS. 5 to 10.

Herein below, only the first link 32, linking the first end 28.1 of the first part 28 and the second end 30.2 of the second part 30 is described. However, the first and second links 32, 34 could be different.

At least one of the first and second links 32, 34 comprises at least one guiding system 36 making it possible to guide the first and second ends 28.1 and 30.2 relative to one another in a direction of introduction DI and at least one locking system 38 making it possible to immobilize the first and second ends 28.1 and 30.2 in the direction of introduction DI.

The first end 28.1 comprises a first end face F28.1 positioned in a longitudinal plane. The second end 30.2 comprises a second end face F30.2 positioned in a longitudinal plane. When the first and second ends 28.1 and 30.2 are linked by the first link 32, the first and second end faces F28.1 and F30.2 are pressed against one another.

The guiding system 36 comprises a tenon 40 integral to the first end 28.1, protruding from the first end face F28.1 and configured to be housed in a recess 42 formed in the second end 30.2 hollowed out relative to the second end face F30.2. The tenon 40 and the recess 42 have complementary forms for the tenon to slide into the recess 42 in the direction of introduction DI (visible in the FIGS. 8 and 10).

According to one embodiment, the tenon 40 comprises a rectangular section in a plane parallel to the first end face F28.1 and has two faces F40.1, F40.2 parallel to the transverse web 22, two rims C40 and C40' at right angles to the faces F40.1, F40.2 and a distal face G40 parallel to the first end face F28.1.

According to one embodiment, the two faces F40.1, F40.2 are spaced apart by a distance substantially equal to the thickness of the transverse web 22. The two rims C40.1, C40.2 are spaced apart by a distance less than the distance separating the inner and outer rings 18, 20.

The recess 42 is delimited by the transverse web 22 and two rails 44, 46, parallel to the transverse web 22, linked respectively to the inner ring 18 and to the outer ring 20.

Each rail 44, 46 delimits, with the transverse web 22, a groove 48, 50 which has a bottom F48, F50. With the two rails 44, 46 being spaced apart, the transverse web 22, the rails 44, 46 and the bottoms F48, F50 of the grooves 48, 50 delimit a T-shaped groove.

The distance between the transverse web 22 and the rails 44, 46 is equal (to within the operating play) to the distance between the faces F40.1, F40.2 of the tenon 40 and the distance between the two bottoms F48, F50 of the grooves 48, 50 is equal (to within the operating play) to the distance between the rims C40.1, C40.2 of the tenon 40.

The rails 44, 46 extend, from the second end face F30.2, over a length substantially equal to the length of the tenon 40 (which corresponds to the distance separating the distal face G40 of the tenon 40 and the first end face F28.1).

In operation, when the tenon 40 is in its recess 42 and the first and second end faces F28.1 and F30.2 are pressed against one another, the first and second ends 28.1 and 30.2 are immobile relative to one another in a longitudinal plane (parallel to the end faces F28.1 and F30.2). They can be displaced only in the direction of introduction DI.

According to one embodiment, the first link 32 comprises two link systems 36, 36' arranged on either side of the transverse web 22.

Thus, the second end 30.2 comprises two recesses 42, 42' that are symmetrical relative to the transverse web 22. The recess 42 is delimited by the transverse web 22 and the two rails 44, 46. The recess 42' is delimited by the transverse web 22 and two rails 44', 46'.

The first end 28.1 comprises two tenons 40, 40' configured to be housed respectively in the recesses 42, 42'.

The first tenon 40 has a rectangular section. The second tenon 40' has an inverted T-shaped section, the head of the T being arranged between the bottoms F48', F50' of the grooves 48', 50' and the leg of the T being arranged between the rails 44', 46'.

The first and second tenons 40 40' are separated by a slit 51 configured to house a part of the transverse web 22.

The locking system 38 is configured to occupy an activated state in which it immobilizes the first and second ends 28.1 and 30.2 in the direction of introduction DI and a deactivated state in which the first and second ends 28.1 and 30.2 can be displaced in the direction of introduction DI.

Figure 10:
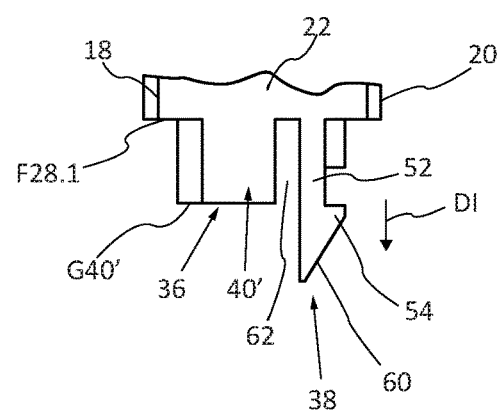
FIG. 10 is a plan view of the second end of the first part of the securing device visible in FIG. 8.

As illustrated by FIG. 10, the locking system 38 comprises a tongue 52, linked to one of the first or second ends 28.1 or 30.2, which has a hook form 54 configured to cooperate with a notch 56 integral to the other of the first or second ends 28.1, 30.2 which offers a bearing surface parallel to the end faces.

According to one configuration, the tongue 52 is integral to the first end 28.1 and the notch 56 is integral to the second end 30.2.

The tongue 52 is elastically deformable between a state of rest in which the tongue 52 is close to the outer ring 20 and the hook form 54 is in contact with the notch 56 and an elastically deformed state in which the tongue 52 is moved away from the outer ring 20 and the hook form 54 is moved away from the notch 56.

The outer ring 20 comprises an orifice or a cutout 58 positioned and dimensioned so as to allow the passage of a tool (such as a push rod for example) making it possible to push the tongue 52 into the deformed state.

The tongue 52 has an inclined flat 60 making it possible to deform the tongue 52 when mounting the parts 28 and 30 of the securing device.

According to one embodiment, at least one of the tenons 40, 40' ensures, in addition to the guiding function, the function of locking system 38 and comprises a slit 62 which links, on one side, the faces F40.1' and F40.2' and, on the other side, the second end face 28.1 and the distal face G40' of the tenon 40', which is at right angles to the transverse web 22 and to the second end face F28.1. This slit 62 makes it possible to separate the tongue 52 from the rest of the tenon 40' and allows it to be able to be deformed between the rest and deformed states.

The tongue 52 has a length (dimensioned taken from the second end face F30.2) greater than the length of the tenon 40' so that the hook form 54 is arranged in the same plane as the distal face G40' of the tenon 40'.

According to another feature, the securing device 16 comprises at least one fixing system 64, 64'.

According to a first embodiment visible in FIGS. 11 and 12, the fixing system 64 is configured to link the duct 10 to a main duct 100.

According to this first embodiment, the fixing system 64 comprises a ring 66 linked to one of the parts 30 and configured to be fitted over the main duct 100.

According to this first embodiment, the fixing system 64 is incorporated in a second securing device 16', the ring 66 fitted over the main duct 100 forming the inner ring of the second securing device 16'.

The outer ring of the second securing device 16' can comprise a plate 68 making it possible to link to a support or a structure.

According to this first embodiment, the duct 10 is linked to a main duct 100 by two securing devices 16, 16', the first securing device 16, surrounding the duct 10, being able to be dismantled and being produced in two parts 28, 30, the second securing device 16', fitted over the main duct 100, being produced in a single piece and comprising a system for fixing to a support or to a structure.

According to a second embodiment visible in FIGS. 13 to 16, the fixing system 64' is separate from the securing device.

According to this second embodiment, the fixing system 64' comprises a body 70 which has a first contact surface F70, configured to be pressed and fixed by link elements 72 onto a support or a structure 71, and a T-shaped groove 74.

The T-shaped groove 74 is configured to receive the outer ring 20 of a securing device 16 and a part of its transverse web 22.

To adapt the fixing system to different dimensions of outer rings 20, the T-shaped groove 74 is adjustable. To this end, the body 70 comprises a first jaw 76 and a second jaw 78 which delimit the T-shaped groove 74 and which are configured to slide relative to one another in order to adjust the dimension of the T-shaped groove 74.

To this end, the first jaw 76 comprises an extension 80 with a trapezoidal section and the second jaw 78 comprises a groove 82 which has a form complementary to that of the extension 80 so that the latter slides in the groove 82 in order to be able to adjust the separation between the first and second jaws 76, 78 and thus adjust the dimension of the T-shaped groove 74.

The fixing system 64' also comprises a link 84 for linking the jaws 76, 78 and keeping them tightened on the securing device 16. In addition to the link 84, each jaw 76, 78 comprises a through-hole T76, T78 configured to allow the link 84 to pass through them.

The link 84 can be a clamping collar.

The principle of operation of the fixing system 64' is simple. Initially, the first and second jaws 76, 78 are separated to position the outer ring 20 in the T-shaped groove 74. Next, the first and second jaws 76, 78 are brought towards one another so as to clamp the outer ring 20. The link 84 is positioned and closed so as to keep the jaws 76, 78 clamped.

Obviously, the fixing system 64' visible in FIGS. 13 to 16 is not limited to this application and can be used to link elements other than the securing device to a support or a structure.

According to one manufacturing method, the securing device and/or the fixing system can be produced by additive manufacturing methods, in polyamide for example.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for securing at least one insulating tube on a duct, comprising:
    an inner ring configured to be mounted on the duct;
    an outer ring coaxial to the inner ring; and
    a transverse web linking the inner and outer rings, each inner or outer ring extending on either side of the transverse web such that the securing device has an I-shaped section in a longitudinal plane and that the inner and outer rings and the transverse web form two recesses, arranged on either side of the transverse web, each configured to receive an end of an insulating tube,
    wherein the securing device comprises first and second parts each extending over a half-circumference of the duct, each of the first and second parts respectively comprising first and second ends, the first end of the first part being linked to the second end of the second part by a first link, the second end of the first part being linked to the first end of the second part by a second link,
    wherein each of the first and second links comprises at least one guiding system making it possible to guide the first and second ends relative to one another in a direction of introduction and at least one locking system making it possible to immobilize the first and second ends in the direction of introduction,
    wherein the locking system comprises a tongue, linked to one of the first or second ends, the tongue having a hook form configured to cooperate with a notch integral to the other of the first or second ends, the tongue being elastically deformable between a state of rest in which the hook form is in contact with the notch and an elastically deformed state in which the hook form is moved away from the notch, and
    wherein the outer ring comprises a circumferentially extending orifice configured to allow a passage of a tool for pushing the tongue into the elastically deformed state.

2. The securing device according to claim 1, wherein the first and second parts of the securing device are identical for each first or second part, the first end being different and complementary to the second end.

3. The securing device according to claim 1, wherein the guiding system comprises at least one tenon integral to the first end, protruding from a first end face of the first end and configured to be housed in at least one recess formed in the second end and hollowed out relative to the second end face of the second end, the tenon and the recess having complementary forms so that the tenon slides into the recess in the direction of introduction, the first and second end faces being pressed against one another when the first and second parts are assembled.

4. The securing device according to claim 3, wherein the recess is delimited by the transverse web and two rails, parallel to the transverse web, linked respectively to the inner ring and to the outer ring.

5. The securing device according to claim 3, wherein the guiding system comprises two tenons, integral to the first end, configured to be housed in two recesses, formed in the second end, that are symmetrical relative to the transverse web.

6. The securing device according to claim 3, wherein the tongue has an inclined flat making it possible to deform the tongue to the deformed state when mounting the two parts of the securing device.

7. The securing device according to claim 3, wherein at least one of the at least one tenon comprises a slit which makes it possible to separate the tongue from the rest of the tenon in order for it to be able to be deformed between the rest and deformed states.

8. The securing device according to claim 1, further comprising a fixing system.

9. The securing device according to claim 8, wherein the fixing system comprises a ring linked to one of the parts of the securing device and configured to be fitted on a main duct.

10. The securing device according to claim 9, wherein the ring is an inner ring of a second securing device.

11. The securing device according to claim 8, wherein the fixing system comprises a body having a first contact surface, configured to be pressed and fixed by link elements onto a support or a structure, and a T-shaped groove configured to receive the outer ring of the securing device and a part of its transverse web.

12. The securing device according to claim 11, wherein the body comprises a first jaw and a second jaw, delimiting the T-shaped groove and configured to slide relative to one another in order to adjust the dimension of the T-shaped groove and wherein the fixing system comprises a link for linking the first and second jaws.

13. A duct equipped with at least one securing device according to claim 1.

\* \* \* \* \*